(12) United States Patent
B.V.

(10) Patent No.: US 10,612,708 B2
(45) Date of Patent: Apr. 7, 2020

(54) FLAT FACE MALE HYDRAULIC COUPLING

(71) Applicant: EATON S.A.S., Annemasse (FR)

(72) Inventor: Chetan B.V., Bengaluru (IN)

(73) Assignee: EATON S.A.S., Annemasse (FR)

( * ) Notice: Subject to any disclaimer, the term of this patent is extended or adjusted under 35 U.S.C. 154(b) by 0 days.

(21) Appl. No.: 16/480,709

(22) PCT Filed: Jan. 26, 2018

(86) PCT No.: PCT/EP2018/051998
§ 371 (c)(1),
(2) Date: Jul. 25, 2019

(87) PCT Pub. No.: WO2018/138284
PCT Pub. Date: Aug. 2, 2018

(65) Prior Publication Data
US 2019/0390809 A1    Dec. 26, 2019

(30) Foreign Application Priority Data

Jan. 27, 2017    (IN) .............................. 201711003100

(51) Int. Cl.
*F16L 37/23*    (2006.01)
*F16L 37/35*    (2006.01)
*F16L 37/34*    (2006.01)

(52) U.S. Cl.
CPC ............... *F16L 37/23* (2013.01); *F16L 37/34* (2013.01); *F16L 37/35* (2013.01)

(58) Field of Classification Search
CPC ............ F16L 37/23; F16L 37/35; F16L 37/34
See application file for complete search history.

(56) References Cited

U.S. PATENT DOCUMENTS

| 2,727,761 A | 12/1955 | Elliott et al. |
| 5,159,955 A | 11/1992 | Ekman |

FOREIGN PATENT DOCUMENTS

| DE | 4101001 A1 | 7/1991 |
| DE | 19624365 C1 | 10/1997 |
| DE | 202006003300 U1 | 7/2007 |
| EP | 2626612 A1 | 8/2013 |

*Primary Examiner* — Marina A Tietjen
(74) *Attorney, Agent, or Firm* — Leydig, Voit & Mayer, Ltd.

(57) ABSTRACT

A flat face male hydraulic coupling includes: a body with a continuous passage having a first section with a first diameter and a second section diameter, the first diameter being smaller than the second diameter; a valve body assembly arranged movable in the continuous body, which valve body assembly includes a first valve portion and a second valve portion telescopically arranged around the first valve portion, the first valve portion being movable between a first, second, and third position, and the second valve portion being taken along by the first valve portion between the second and third positions; first sealing means sealing the first valve portion in the first position to a surface of the continuous passage; second sealing means sealing the second valve portion in the second position to the surface of the continuous passage; and third sealing means sealing the first valve portion to the second valve portion.

7 Claims, 2 Drawing Sheets

FLAT FACE MALE HYDRAULIC COUPLING

CROSS-REFERENCE TO PRIOR APPLICATIONS

This application is a U.S. National Phase application under 35 U.S.C. § 371 of International Application No. PCT/EP2018/051998, filed on Jan. 26, 2018, and claims benefit to Indian Patent Application No. IN 201711003100, filed on Jan. 27, 2017. The International Application was published in English on Aug. 2, 2018 as WO 2018/138284 under PCT Article 21(2).

FIELD

The invention relates to a flat face male hydraulic coupling which may be used to connect hoses under pressure, comprising:
- a body with a continuous passage having a first section with a first diameter and a second section diameter, wherein the first diameter is smaller than the second diameter;
- a valve body assembly arranged movable in the continuous body, which valve body assembly comprises a first valve portion and a second valve portion telescopic arranged around the first valve portion, wherein the first valve portion is movable between a first, second and third position and wherein the second valve portion is taken along by the first valve portion between the second and third position;
- first sealing means for sealing the first valve portion in the first position to the surface of the continuous passage;
- second sealing means for sealing the second valve portion in the second position to the surface of the continuous passage;
- third sealing means for sealing the first valve portion to the second valve portion, wherein the third sealing means is at least a two stage sealing and wherein a relief passage is arranged in the second valve portion extending in radial direction and between the two stages of the two stage sealing.

BACKGROUND

Flat face hydraulic couplings are typically used to connect pressurized hydraulic fluid lines. Due to the construction of a connect under pressure flat face hydraulic coupling, it is not necessary to depressurize the hydraulic system.

A flat face hydraulic coupling suitable to connect under pressure typically consists of a female and a male coupling, wherein the male coupling is arranged to the pressurized fluid line. When the male coupling is inserted into female coupling, a pusher rod in the female coupling will push the first valve portion from the first to the second position. With this movement, the female coupling will seal onto the male coupling. Furthermore a small relieve passage is opened in this second position, such that the pressure over the second sealing means is relieved.

As the pressure is relieved over the second sealing means, it is possible to further insert the male coupling, wherein the second valve portion is taken along to the third position and the flow path is fully opened. In the third position, the female coupling will provide a mechanical coupling to the male coupling.

In known flat face hydraulic couplings suitable to connect under pressure, the relieve passage runs via the inner space of the valve body assembly. As a result, there will be an amount of hydraulic fluid present in the inner space of the valve body assembly. When the male connector is inserted into the female connector and the first valve portion is telescopically moved into the second valve portion, this amount of hydraulic fluid needs to be diverted, which negatively impacts the force required to connect the flat face couplings.

EP2626612A1 describes a coupling device with residual pressure relief system.

DE 202006003300 discloses a hydraulic coupling, wherein a telescopic valve body assembly is provided. The inner space is in contact with ambient air and accordingly no fluid needs to be compressed for the telescopic valve body assembly to be moved. However, in this prior art coupling, the pressure is not relieved over the second sealing means. Instead the pusher rod of the female coupling operates a small hydraulic actuator arranged in the male connector, which generates sufficient force to directly move a third valve portion and to overcome the pressure difference over the second sealing means.

The arrangement of a third valve portion and of a small hydraulic actuator results in a complex flat face male coupling suitable to connect under pressure.

Accordingly, it is an object of the invention to reduce or even remove the above mentioned disadvantages.

SUMMARY

In an embodiment, the present invention provides a flat face male hydraulic coupling, comprising: a body with a continuous passage having a first section with a first diameter and a second section diameter, wherein the first diameter is smaller than the second diameter; a valve body assembly arranged movable in the continuous body, which valve body assembly comprises a first valve portion and a second valve portion telescopically arranged around the first valve portion, wherein the first valve portion is movable between a first, second, and third position, and wherein the second valve portion is taken along by the first valve portion between the second and third positions; first sealing means for sealing the first valve portion in the first position to a surface of the continuous passage; second sealing means for sealing the second valve portion in the second position to the surface of the continuous passage; third sealing means for sealing the first valve portion to the second valve portion, wherein the third sealing means is at least a two stage sealing, and wherein a relief passage is arranged in the second valve portion extending in a radial direction and between the two stages of the two stage sealing, wherein the first valve portion is provided with a recess in an outer surface, which recess is positioned outside of the third sealing means in the first position, and which recess overlaps with one stage of the two stage sealing in the second position, such that pressure is relieved over the second sealing means via the relief passage and the recess.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
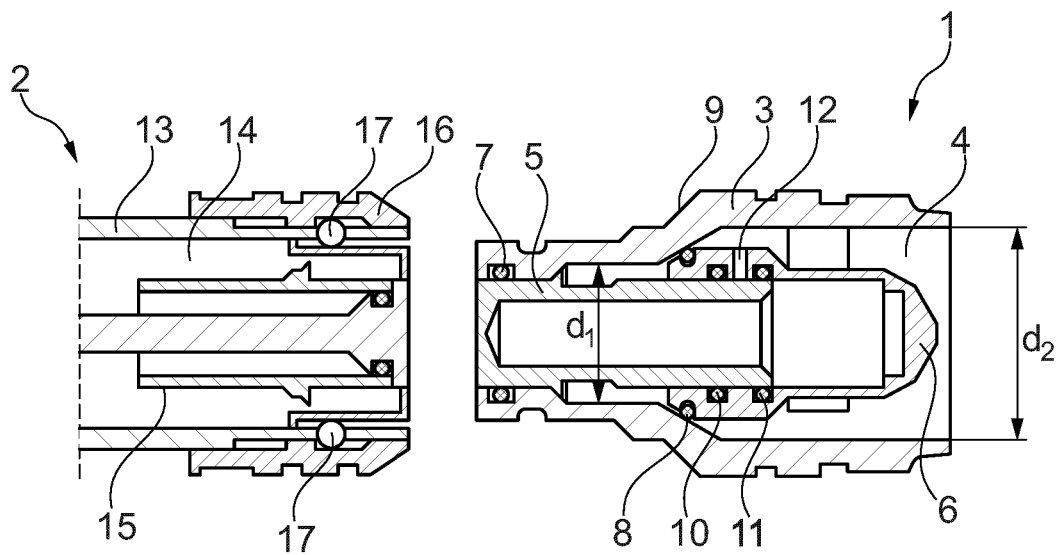
FIGS. 1-4 show in cross-section an embodiment of a flat face male hydraulic coupling suitable to connect under pressure in different stages of coupling with a flat face female hydraulic coupling.

In an embodiment, the present invention provides a flat face male hydraulic coupling, which coupling is characterized in that the first valve portion is provided with a recess on the outer surface, which recess is positioned outside of the third sealing means in the first position and which recess overlaps with one stage of the two stage sealing in the second position, such that pressure is relieved over the second sealing means via the relief passage and the recess.

With the recess arranged in the outer surface of first valve portion it is possible to provide a pressure relieve path, which remains outside of the inner space of the valve body assembly. As a result, the inner space can remain separated from the hydraulic fluid and the force required to move the first valve portion from the first to the second position is reduced as no hydraulic fluid needs to be diverted as is the case with the prior art.

Because in the second position of the first valve portion the pressure is relieved over the second sealing means, the force to move the first valve portion to the third position is also reduced.

In a preferred embodiment of the flat face male hydraulic coupling according to the invention the second sealing means seal to the transition surface from the first diameter to the second diameter.

At the transition surface from the first diameter to the second diameter, the continuous passage widens allowing for an easy sealing in axial direction of the second valve portion in the second position to the surface of the continuous passage. When the second valve portion is moved to the third position, the sealing will be lifted allowing for a free flow of hydraulic fluid.

Preferably, the first sealing means and second sealing means comprise at least one O-ring.

In a further preferred embodiment of the flat face male hydraulic coupling according to the invention each stage of the third sealing means comprises an O-ring arranged in circumferential grooves in the inner surface of the second valve portion.

With the O-rings a reliable sealing is provided, while by the arrangement in grooves a reliable separation of each stage is provided and space is provided to arrange a relieve passage in radial direction connecting the inner surface with the outer surface of the second valve portion.

With the invention, in the third position of the first valve portion a flow path is formed between the surface of the continuous passage, the outer surface of the first valve portion and the outer surface of the second valve portion.

Furthermore with the invention, the inner space of the valve body assembly is sealed with respect to the outside of the valve body assembly. Preferably, the inner space is exclusively filled with a compressible gas, such as air.

By having the inner space of the telescopic valve body assembly being sealed with respect to the outside of the valve body assembly, it is prevented that any hydraulic fluid flowing along the valve body assembly penetrates the inner space. As no hydraulic fluid can enter the inner space, only the medium, which is preferably a compressible gas, such as air, needs to be compressed when the flat face male hydraulic coupling is inserted into the flat face female hydraulic coupling. This results in a reduction of the insertion force, while having a male coupling with few parts.

FIG. 1 shows a flat face male hydraulic coupling 1 and a flat face female hydraulic coupling 2 which are suitable to connect under pressure. The male coupling 1 has a body 3 with a continuous passage 4 having a first section with diameter $d_1$ and a second section with diameter $d_2$.

A valve body assembly having a first valve portion 5 and a second valve portion 6 telescopic arranged on the first valve portion 5, is arranged in the continuous passage 4.

A first O-ring 7 is provided to seal the first valve portion 5 to the surface of the continuous passage 4. A second O-ring 8 is provided to seal the second valve portion 6 to transition surface 9, where the continuous passage 4 widens from the first diameter $d_1$ to the second diameter $d_2$. Furthermore, a two stage sealing 10, 11 is provided in the inner surface of the second valve portion 6 to seal the first valve portion 5. A relieve passage 12 is arranged between the first stage O-ring 10 and the second stage O-ring 11.

The flat face female hydraulic coupling 2 is not fully described, but has at least a body 13 with a pusher rod 14 and a fluid channel 15 for passage of hydraulic fluid. Furthermore a locking sleeve 16 co-acting with balls 17 is provided on the outside of the body 13.

Figure 2:
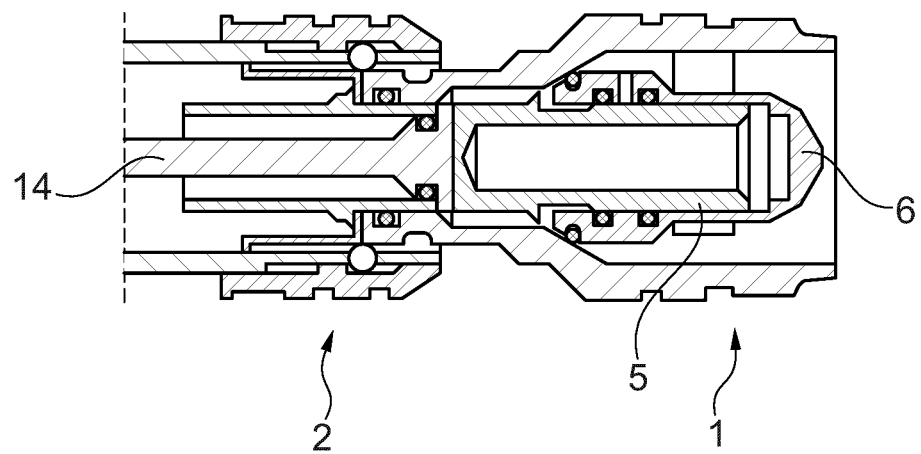

In FIG. 2 the male 1 and female 2 couplings are shown partially inserted. The pusher rod 14 has pushed the first valve portion 5 from a first position into the second valve portion 6.

The end of the body 3, which is inserted into the female coupling 2 now seals with the first O-ring 7 onto the fluid channel 15, ensuring that already a fluid tight connection is present between both couplings 1, 2.

Figure 3:
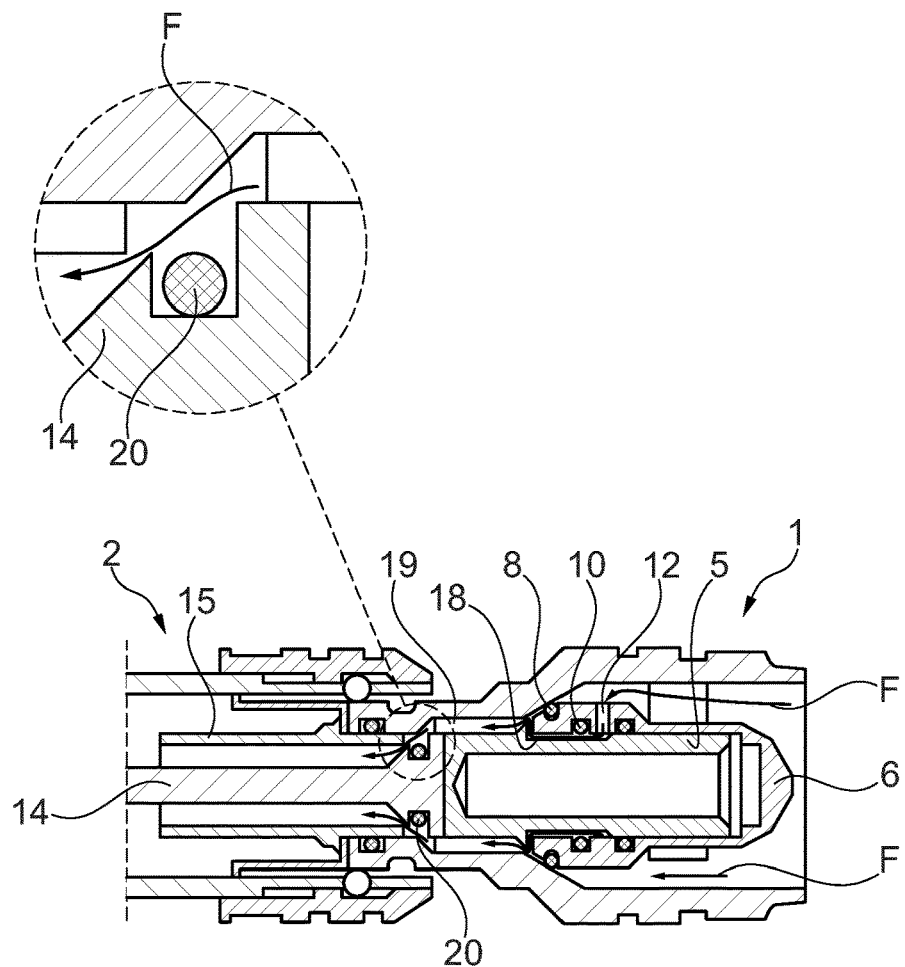

FIG. 3 shows both couplings 1, 2 inserted further, wherein the first valve portion has reached the second position. In this second position, a recess 18 arranged on the outer surface of the first valve portion 5 is moved under the first stage O-ring 10 such that hydraulic fluid F can flow from continuous passage 4 via the relieve passage 12 through the recess 18 into the space 19 between the surface of the continuous passage and the first valve portion 5. Because the first O-ring seals onto the fluid channel 15 and the seal 20 is released from the inside of the fluid channel 15, the pressure around the second seal 8 is relieved and a small fluid flow F is possible through the passage 12 into the space 19 along the released seal 20 into the female coupling.

Figure 4:
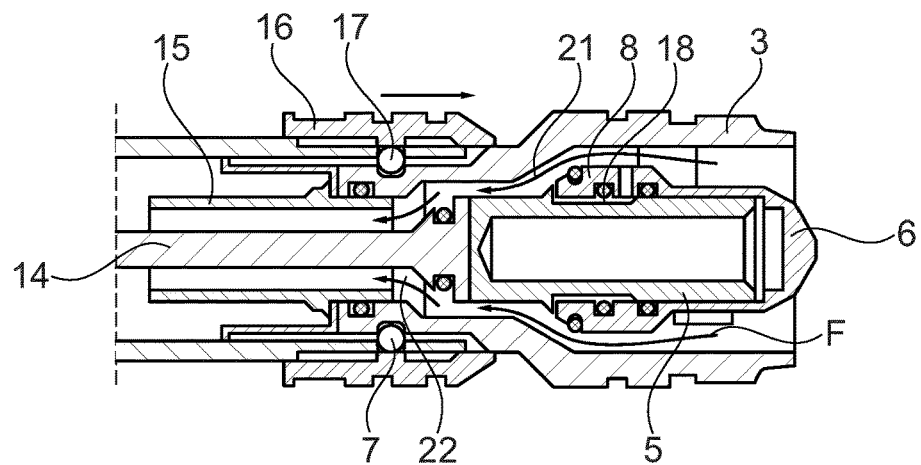

FIG. 4 shows both couplings 1, 2 in full connected position. The pusher rod 14 has pushed the first valve portion 5 to a third position taking the second valve portion 6 along, such that a passage 21 past the second seal 8 is opened.

Due to this final movement, the body 3 has pushed the fluid channel 15 off the pusher rod 14, such that a passage 22 is created and a free fluid flow of hydraulic fluid F is allowed through the male coupling 1 to the female coupling 2.

The balls 17 of the locking sleeve 16 are accommodated in an outer circumferential groove on the body 3, such that the locking sleeve 16 will be shifted and the coupling of male coupling 1 and female coupling 2 is locked.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A flat face male hydraulic coupling, comprising:
   a body with a continuous passage having a first section with a first diameter and a second section diameter, wherein the first diameter is smaller than the second diameter;
   a valve body assembly arranged movable in the continuous body, which valve body assembly comprises a first valve portion and a second valve portion telescopically arranged around the first valve portion, wherein the first valve portion is movable between a first, second, and third position, and wherein the second valve portion is taken along by the first valve portion between the second and third positions;
   first sealing means for sealing the first valve portion in the first position to a surface of the continuous passage;
   second sealing means for sealing the second valve portion in the second position to the surface of the continuous passage;
   third sealing means for sealing the first valve portion to the second valve portion, wherein the third sealing means is at least a two stage sealing, and wherein a relief passage is arranged in the second valve portion extending in a radial direction and between the two stages of the two stage sealing,
   wherein
      the first valve portion is provided with a recess in an outer surface, which recess is positioned outside of the third sealing means in the first position, and which recess overlaps with one stage of the two stage sealing in the second position, such that pressure is relieved over the second sealing means via the relief passage and the recess.

2. The flat face male hydraulic coupling according to claim 1, wherein the second sealing means are configured to seal a transition surface from the first diameter to the second diameter.

3. The flat face male hydraulic coupling according to claim 1, wherein the first sealing means and second sealing means each comprise at least one O-ring.

4. The flat face male hydraulic coupling according to claim 1, wherein each stage of the third sealing means comprises an O-ring arranged in circumferential grooves in an inner surface of the second valve portion.

5. The flat face male hydraulic coupling according to claim 1, wherein in the third position of the first valve portion a flow path is formed between the surface of the continuous passage, the outer surface of the first valve portion, and an outer surface of the second valve portion.

6. The flat face male hydraulic coupling according to claim 1, wherein an inner space of the valve body assembly is sealed with respect to an outside of the valve body assembly.

7. The flat face male hydraulic coupling according to claim 6, wherein the inner space is exclusively filled with a compressible gas comprising air.

* * * * *